United States Patent
Sakaguchi et al.

[11] Patent Number: 5,911,029
[45] Date of Patent: *Jun. 8, 1999

[54] APPARATUS FOR RECORDING AND PLAYBACK OF A TELEVISION BROADCAST SIGNAL CAPABLE OF PLAYBACK WITH COMMERCIALS SKIPPED BY A SIMPLE OPERATION

[75] Inventors: Hiroshi Sakaguchi, Amagasaki; Takao Nishiyama, Katano; Seiji Hashimoto, Daito; Michihiro Fujiyama, Tsuduki-gun, all of Japan

[73] Assignee: Sanyo Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,170

[22] Filed: Feb. 19, 1997

[30] Foreign Application Priority Data

Mar. 14, 1996 [JP] Japan ................................ 8-057617
Oct. 24, 1996 [JP] Japan ................................ 8-282384

[51] Int. Cl.$^6$ .................................................. H04N 5/76
[52] U.S. Cl. ........................... 386/46; 386/80; 386/81; 358/908
[58] Field of Search .................... 386/1, 4, 45, 52, 386/55, 80, 108, 125–126, 46, 81; 358/908; 348/571, 907; 360/13, 69, 71; H04N 5/76

[56] References Cited

U.S. PATENT DOCUMENTS

| | | | |
|---|---|---|---|
| 4,224,644 | 9/1980 | Lewis et al. | 360/72.2 |
| 4,259,689 | 3/1981 | Bonner et al. | 358/165 |
| 4,314,285 | 2/1982 | Bonner et al. | 360/33 |
| 4,319,286 | 3/1982 | Hanpachern | 360/33 |
| 4,390,904 | 6/1983 | Johnson et al. | 358/335 |
| 4,430,676 | 2/1984 | Johnson | 360/13 |
| 4,602,297 | 7/1986 | Reese | 360/14.1 |
| 4,618,895 | 10/1986 | Wright | 358/311 |
| 4,750,052 | 6/1988 | Poppy et al. | 358/335 |
| 4,750,053 | 6/1988 | Allen | 358/335 |
| 4,751,213 | 6/1988 | Novak | 455/67 |
| 4,752,834 | 6/1988 | Koombes | 358/335 |
| 4,782,401 | 11/1988 | Faerber et al. | 358/335 |
| 4,979,047 | 12/1990 | Wine | 358/335 |
| 5,151,788 | 9/1992 | Blum | 358/188 |
| 5,333,091 | 7/1994 | Iggulden . | |
| 5,343,251 | 8/1994 | Nafah | 348/571 |

FOREIGN PATENT DOCUMENTS

| | | | |
|---|---|---|---|
| 58-146072 | 8/1983 | Japan | G11B 27/02 |
| 3-158086 | 7/1991 | Japan | H04N 5/782 |
| 3-262287 | 11/1991 | Japan | H04N 5/782 |

*Primary Examiner*—Andrew I. Faile
*Assistant Examiner*—Vincent F. Boccio
*Attorney, Agent, or Firm*—Michaelson & Wallace; Peter L. Michaelson

[57] ABSTRACT

While television broadcast signals are reproduced by a mechanism, if a commercial starts, the user operates a remote controller to set the VCR to cue mode. Thereafter, a black frame detecting portion detects a black frame included in the reproduced signals between the commercial and a main program, whereby microcomputer switches the VCR to standard playback mode at the time point of detection.

13 Claims, 10 Drawing Sheets

APPARATUS FOR RECORDING AND PLAYBACK OF A TELEVISION BROADCAST SIGNAL CAPABLE OF PLAYBACK WITH COMMERCIALS SKIPPED BY A SIMPLE OPERATION

BACKGROUND OF THE INVENTION

1. Field of the Invention

The present invention relates to an apparatus for recording and playback television broadcast such as a video cassette recorder (VCR).

2. Description of the Background Art

When a television broadcast is once recorded by a VCR and the user subsequently watches the recorded broadcast content at a convenient time, commercials (CM) broadcast amid the recorded program are, inherently, not necessary for the user.

Therefore, the user wishes to skip the commercials. For this purpose, conventionally, the user sets the VCR to cue mode when a commercial starts during playback, and sets the VCR again to standard playback mode when the commercial ends. Hence, the user must do two operations.

However, as the user first confirms the end of the commercial and then sets the VCR to standard playback mode, while the user is confirming, tape is moving fast in relatively the cue mode; hence the content of the program immediately after the end of the commercial may be missed. In order to adjust excessive feeding of the tape, the user may set the VCR a review mode, searching for the start of the program after the commercial. However, it is difficult to stop the tape exactly at the end of the commercial by cueing or reviewing.

A VCR having a commercial skipping function has been known which utilizes the fact that the period of a commercial is, in principle, thirty seconds, and therefore, in one operation, cues the tape corresponding to thirty seconds and thereafter automatically returns to the playback state automatically. However, to cope with common commercials broadcast for about two minutes, such an operation must be repeated four times. Further, such a VCR cannot cope with an exceptionally short commercial of which length is ten seconds, fifteen seconds or the like.

Further, in Japan, a conventional video tape recorder (VTR) utilizes the fact that standard sound of foreign movies is broadcast a bilingual mode while commercials are broadcast in stereo mode. Such a VTR stops recording when a pilot signal of a bilingual broadcast is not detected, so as to prevent a commercial from being recorded. Further, a VTR has been known which marks a commercial period on the tape when the pilot signal of bilingual broadcast is not detected while recording, and in which the commercial period is cued based on the mark during playback. However, these methods utilizing sound multiplexed signal can only cope with limited programs.

SUMMARY OF THE INVENTION

An object of the present invention is to provide an apparatus for recording and playback of television broadcast signals and which is capable of appropriately skipping a commercial by a simple operation in reproducing recorded US and European television broadcasts.

According to one aspect of the present invention, the recording and playback apparatus includes: a recording and playback unit for recording television broadcast signals on a recording medium and for reproducing the television broadcast signals recorded on the recording medium; an event detector for detecting an event included in the television broadcast signals reproduced, by the recording and playback unit, from the recording, medium; a remote controller operated by a user; and a control device for controlling the recording and playback unit in response to an instruction signal from the remote controller; in which the control device includes a first setting circuit for setting the recording and playback unit to, cue mode by a first operation by the user during reproduction of the television broadcast signals, a storing circuit for storing an event detection signal output from the event detector after the first operation by the user, a comparing circuit for comparing the event detection signal stored in said storing circuit with a preset first threshold value, and a second setting circuit for setting, when it is determined by the comparing circuit that the event detection signal exceeded the first threshold value, the recording and playback unit to a standard playback mode.

According to another aspect of the present invention, in the recording and playback apparatus, the control device further includes a third setting circuit for setting the recording and playback unit to the standard playback mode the cue is to continue past a preset first period in the recording and playback unit.

According to a still further aspect of the present invention, in the recording and playback apparatus, the control device further includes a circuit for controlling the recording and playback unit such that when the recording and playback unit is in the cue mode, an event exceeding the first threshold value is not detected by the event detector in a predetermined second period and an event exceeding a second threshold value smaller than the first threshold value is detected, standard playback is started from the position of the last detected event that exceeds the second threshold value.

In accordance with a still further aspect of the present invention, in the recording and playback apparatus, the control device further includes a circuit for changing the first threshold value in response to an operation of the remote controller by the user.

Therefore, an advantage of the present invention is that during reproduction of recorded television broadcast signals, a commercial portion can be skipped by only one operation by the user.

Another advantage of the present invention is that the recording and playback apparatus can be switched from the cue mode to the standard playback mode regardless of presence/absence of an event in the television broadcast signals.

A still further advantage of the present invention is that even when there is not an event that exceeds the first threshold value at the final portion of a commercial, reproduction can be performed while appropriately skipping the commercial portion by detecting an event that exceeds the second threshold value which is smaller than the first threshold value.

A still further advantage of the present invention is that the commercial portion can be appropriately skipped without failure as the threshold value, which is used as a reference for detecting an event can be varied.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
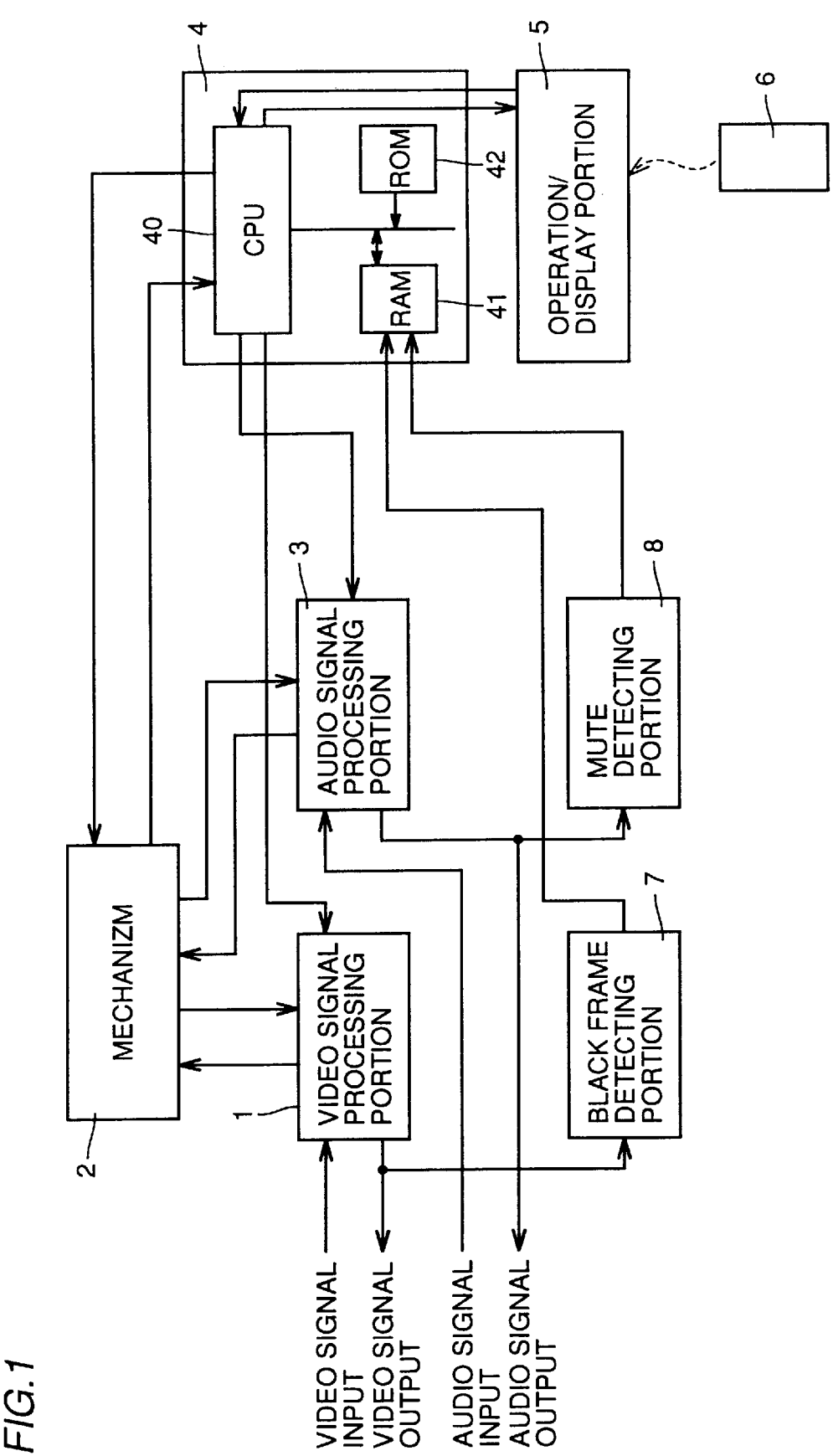
FIG. 1 is a block diagram showing a structure of a recording and playback apparatus in accordance with a first embodiment of the present invention.

In the following, embodiments of the present invention will be described in detail with reference to the figures.

In the figures, the same reference characters denote identical or corresponding elements.

[First Embodiment]

FIG. 1 is a block diagram showing a structure of a recording and playback apparatus in accordance with a first embodiment of the present invention.

As shown in FIG. 1, the recording and playback apparatus includes a video signal processing portion 1 for performing processes such as modulation-demodulation of video signals, an audio signal processing portion 3 for performing processes such as modulation.demodulation of audio signals, a mechanism 2 for recording or reproducing video signals output from video signal processing portion 1 and audio signals output from audio signal processing portion 3 on or from a magnetic type (videotape), a mute detecting portion 8 for detecting a mute period of the audio signals output from audio signal processing portion 3, and a black frame detecting portion 7 for detecting a black frame (B.F.) included in the video signals output from video signal processing portion 1.

Here, the black frame refers to a signal for displaying a black image plane existing between commercials or between a commercial and a program during a television broadcast especially in the United States. The black image plane may continue for several fields or several tens of fields.

The recording and playback apparatus in accordance with the present embodiment further includes a remote controller 6 operated by a user for setting an operation mode such as recording and playback; an operation/display portion 5 for outputting an instruction signal upon reception of a remote control signal output from remote controller 6; and a microcomputer 4 receiving an instruction signal from operation/display portion 5 and detection signals from black frame detecting portion 7 and mute detecting portion 8 for controlling mechanism 2, video signal processing portion 1 and audio signal processing portion 3.

Microcomputer 4 includes a CPU 40, a RAM 41 and a ROM 42.

Figure 2:
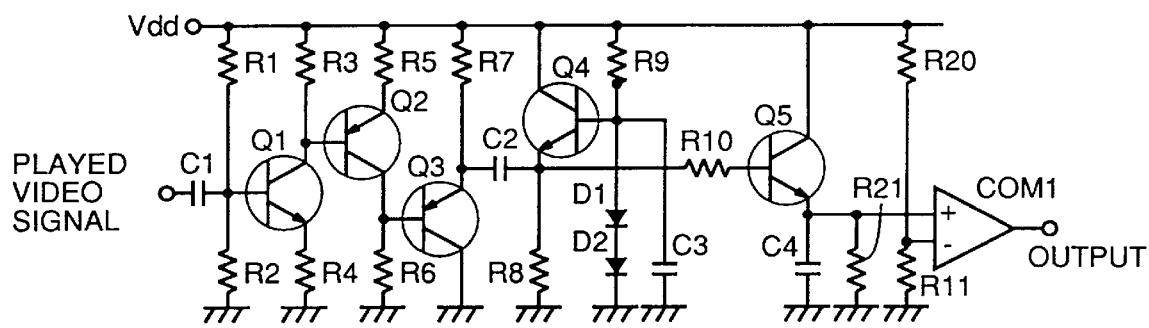
FIG. 2 is a circuit diagram showing a specific structure of a black frame detecting portion shown in FIG. 1.

FIG. 2 is a circuit diagram showing a specific structure of black frame detecting portion 7.

As shown in FIG. 2, black frame detecting portion 7 includes bipolar transistors Q1 to Q5, resistors R1 to R11, R20 and R21, diodes D1 and D2, capacitors C1 to C4, and an operational amplifier COM1.

The operation of the circuit will be briefly described in the following.

When a reproduced video signal is input, it is amplified by bipolar transistors Q1 to Q3, and then clamped by a DC voltage of a synchronizing signal at capacitor C2 and bipolar transistor Q4. The clamped video signal has its high frequency component removed by bipolar transistor Q5 and capacitor C4, and converted to a DC voltage which is in proportion to an AC level. The DC voltage is compared with a reference voltage determined by resistors R11 and R20 by operational amplifier COM1. At this time, if the DC voltage input to operational amplifier COM1 is higher than the reference voltage (when there is a video signal), a high level signal is output from operational amplifier COM1. When the DC voltage input to operational amplifier COM1 is lower than the reference voltage (i.e. at the time of a black frame), a low level signal is output from operational amplifier COM1.

Figure 3:
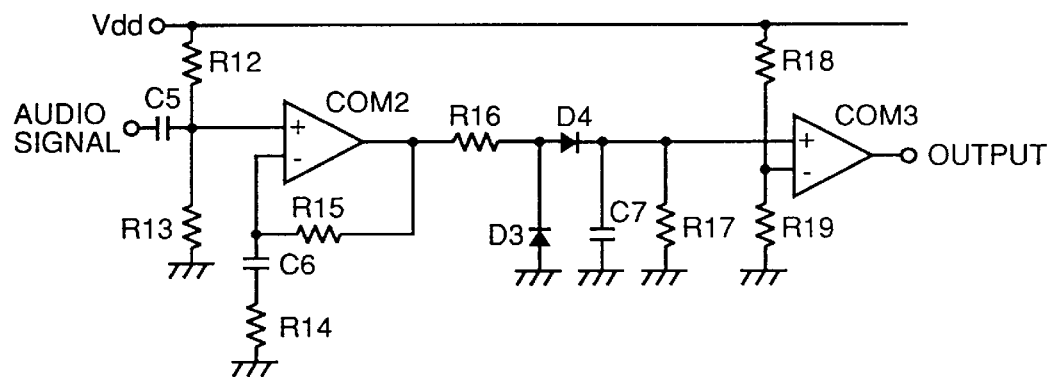
FIG. 3 is a circuit diagram showing a specific structure of a mute detecting portion shown in FIG. 1.

FIG. 3 is a circuit diagram showing a specific structure of mute detecting portion 8.

As shown in FIG. 3, mute detecting portion 8 includes resistors R12 to R19, diodes D3 and D4, capacitors C5 to C7, and operational amplifiers COM2 and COM3.

The operation of the circuit will be briefly described in the following.

When a reproduced audio signal is input, it is amplified by operational amplifier COM2, and it is rectified by diodes D3 and D4 and capacitor C7.

Consequently, a DC voltage which is in proportion to the level of the input audio signal is generated, which is compared by operational amplifier COM3 with a reference voltage determined by magnitude of resistors R18 and R19. As a result, when the DC voltage input to operational amplifier COM3 is higher than the reference voltage (i.e. when there is sound), a high level signal is output. When the DC voltage input to operational amplifier COM3 is lower than the reference voltage (i.e. mute), a low level signal is output.

Figure 4:
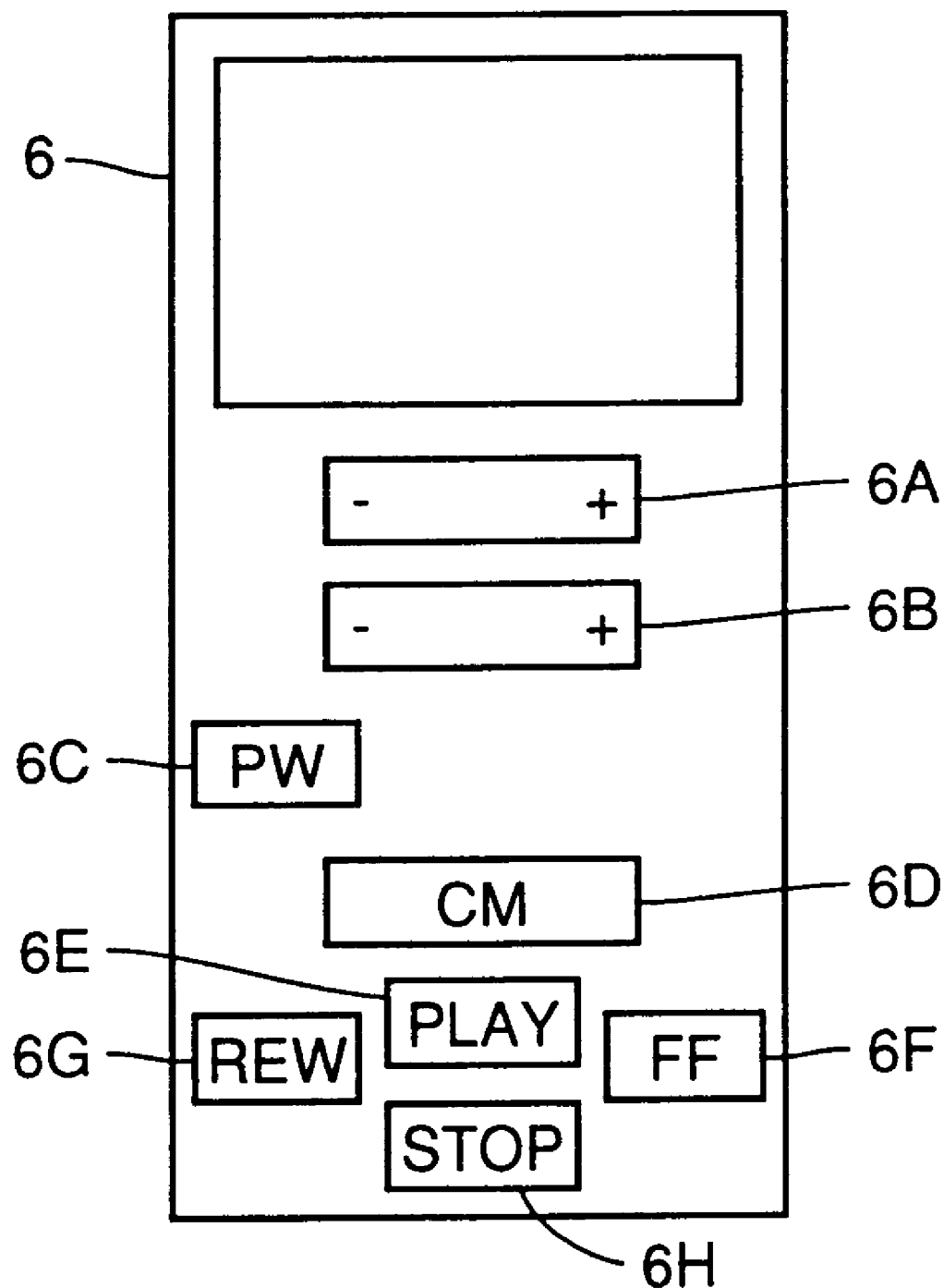
FIG. 4 specifically shows a remote controller shown in FIG. 1.

FIG. 4 specifically shows remote controller 6 shown in FIG. 1.

Referring to FIG. 4, remote controller 6 includes an up-down key 6A for selecting a channel, an up-down key 6B for setting volume, a power key 6C, a playback key 6E, a cue key 6F, a REW (review) key 6G, a stop key 6H and a commercial skip key 6D.

Operation of the recording and playback apparatus in accordance with the first embodiment of the present invention will be described in the following.

First, recording operation will be described. With reference to FIG. 1, the video signal output from a tuner is first input to video signal processing portion, subjected to modulation or the like and fed to mechanism 2. Mechanism 2 records the received video signal on a magnetic tape (videotape). The recording operation mentioned above is controlled by an operation of remote controller 6 by the user. More specifically, when operated, remote controller 6 outputs a remote control signal in accordance with the operation of the user to operation/display portion 5, which, in turn, outputs an instruction signal in accordance with the remote control signal to microcomputer 4. Then, microcomputer 4 controls operation of mechanism 2.

Similarly, an audio signal output from the tuner is input to audio signal processing portion 3, subjected to modulation or the like and fed to mechanism 2. Mechanism 2 records the supplied audio signal on the magnetic tape.

Playback operation will be described in the following.

When the user designates the playback mode by operating remote controller 6, microcomputer 4 in response to an instruction signal from operation/display portion 5, controls mechanism 2 such that video and audio signals recorded on the magnetic tape are reproduced. The video signal reproduced by mechanism 2 is supplied to video signal processing portion 1 where the video signal is subjected to processing such as demodulation, and thereafter output to a television receiver as reproduced video signal, and it is also supplied to black frame detecting portion 7. Black frame detecting portion 7 detects a black frame included in the reproduced video signal, and supplies the result of detection to RAM 41 included in microcomputer 4.

The audio signal reproduced by mechanism 2 is fed to audio signal processing portion 3 and subjected to processing such as demodulation, and output to the television receiver as reproduced audio signal, which is also supplied to mute detecting portion 8. Mute detecting portion 8 detects mute period in the audio signals, and supplies the detected period to RAM 41 included in microcomputer 4.

A commercial skip operation will be described with reference to the flow chart of FIG. 5 and timing charts of FIGS. 6 to 9, all of which the reader should simultaneously refer.

Figure 6:
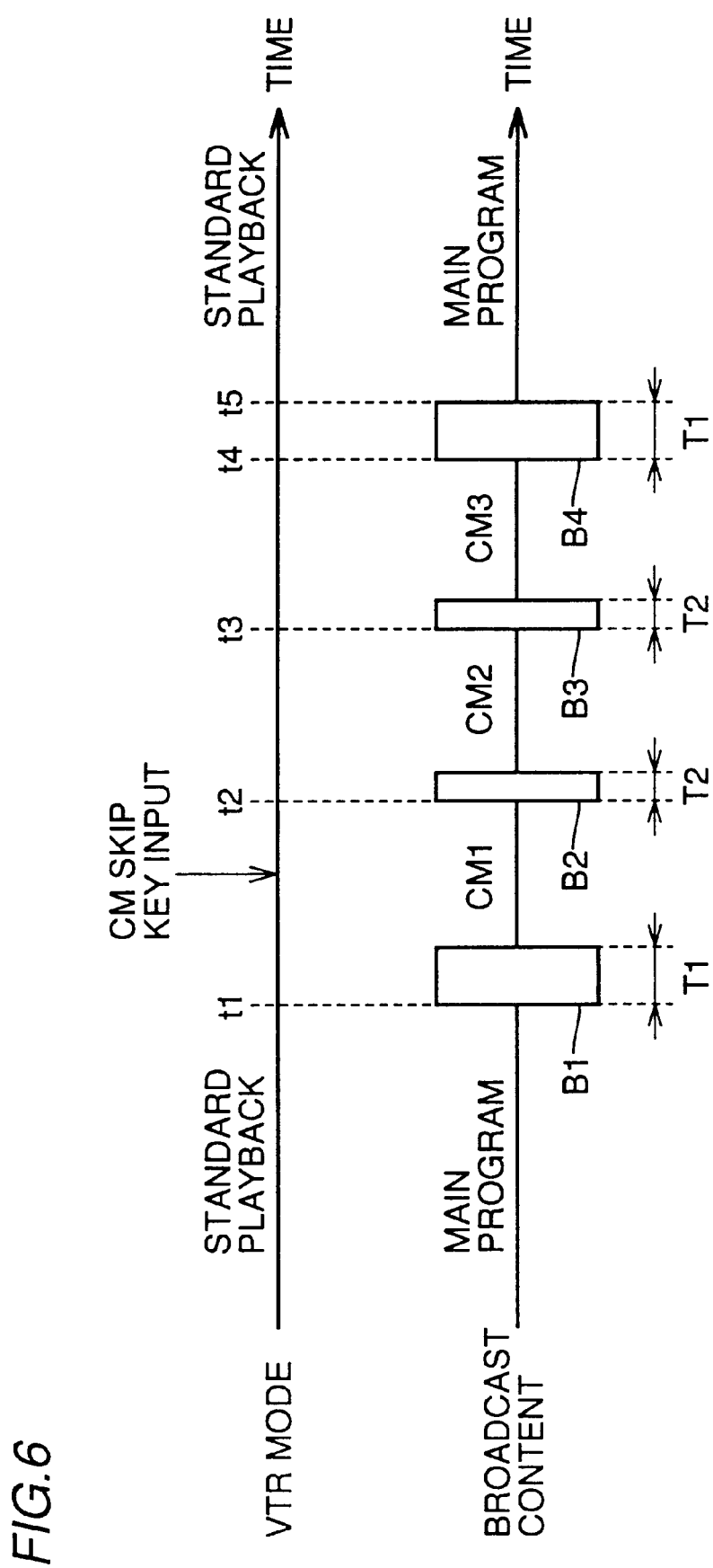
FIGS. 6 to 9 are timing charts showing the operation of the recording and playback apparatus shown in FIG. 1.

First, as shown in FIG. 6, description will be given assuming that there are commercials CM1, CM2 and CM3 between main programs, a black frame B1 having a time width T1 between the main program and commercial CM1, a black frame B2 having time width T2 (<T1) between commercials CM1 and CM2, a black frame B3 having time width T2 between commercials CM2 and CM3, and a black frame B4 having time width T1 between commercial CM3 and the main program.

Now, assume that the user is watching a recorded television program setting the VCR to a standard playback state and after time t1, a commercial CM1 starts during the program in step S1. Then, in step S2, the user presses the commercial.skip key 6D on remote controller 6 once. Accordingly, in step S3, and after the commercial has started, microcomputer 4 sets the VCR to cue mode.

Next, in step S4, whether there is a black frame having a time width of T1 or longer is determined. However, a black frame having a time width of T1 or longer is not detected. Therefore, in step S5, at time t2, a black frame B2 having the time width of T2 or longer is detected. The position of black frame B2 is stored in step S6 in RAM 41 included in microcomputer 4. Further, the flow returns to step S4, and at time t3, black frame B3 is detected in step S5. The position of black frame B3 is also stored in RAM 41 in step S6.

Again returning to step S4, black frame B4 having the time width of T1 or longer is detected at time t4, and standard playback mode is resumed at time t5 in step S12.

Figure 7:
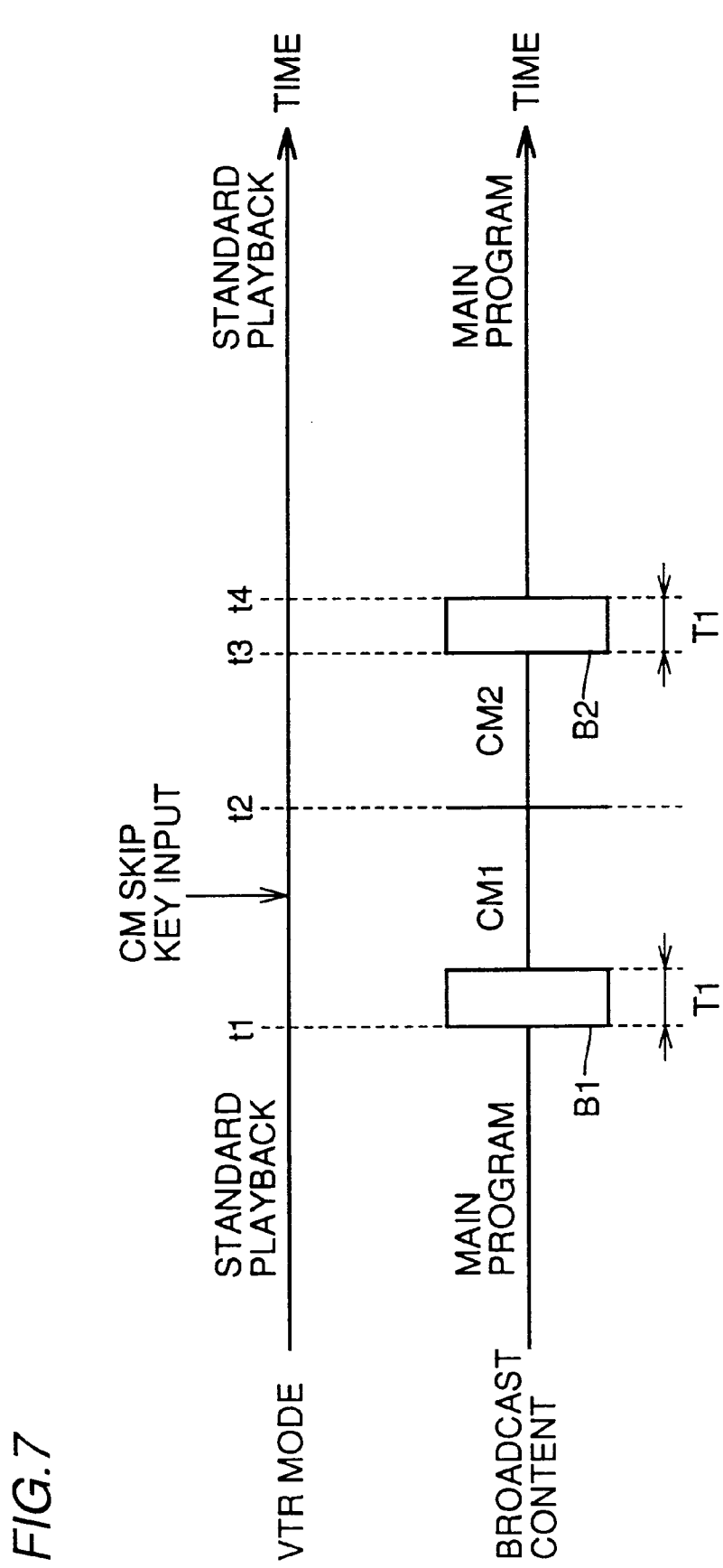

Next, referring to FIG. 7, operation when there are commercials CM1 and CM2 between main programs, a black frame B1i having a time width T1 between the main program and commercial CM1, and a black frame B2 having time width T1 between commercial CM2 and the main program will be described.

In that case, after the VCR is switched to the cue mode in step S3, in step S4, black frame B2 having time width T1 is detected at time t3. Therefore, standard playback mode starts at time t4, ih step S12.

Next, referring to FIG. 8, operation when there are commercials CM1 and CM2 between main programs, a black frame B1 having the time width T1 between the main program and commercial CM1, a black frame B2 having a time width T2 between commercials CM1 and CM2, and a black frame B3 having the time width T2 between commercial CM2 and the main program will be described.

In that case, after the VCR is switched to the cue mode in step S3, black frame B2 is detected at time t2 in step S5, and in step S6, the position of black frame B2 is stored in RAM 41 included in microcomputer 4.

Then, also in step S5, black frame B3 is detected at time t3, and the position of black frame B3 is stored in RAM 41 in step S6.

Then, again in step S4, a black frame having the time width of T1 or longer is searched. Thereafter, in step S5, a black frame having the time width of T2 or longer is searched. In step S7, whether a black frame having the time width of T2 or longer is detected or not within a predetermined time period T3 (for example, thirty seconds) from time t7 is determined. If it is not detected, whether or not a black frame having the time width of T2 or longer has been detected or not is determined in step S8. In this case, black frames B2 and B3 each having the time width of T2 or longer have been detected, the flow proceeds to S9, and microcomputer 4 sets the VCR to the review mode. In step S10, microcomputer 4 calls the position of the last detected black frame B3 from RAM 41 to CPU 40, rewinds the tape to that position, and sets the VCR to standard playback mode in step S12.

More specifically, utilizing the fact that the time width T1 of a black frame existing between a main program and a commercial or a commercial and a main program is generally 50 fields or more and that the time width T2 of a black frame between commercials is generally 5 fields or more, if a black frame having the time width T1 is detected, the content following the frame is considered the main program, and hence standard playback is resumed.

Meanwhile, if a black frame having the time width T1 is not detected in an exceptional case such as described above, the time when the black frame having the time width T2 is last detected is determined as the start of main program, and standard playback starts.

Figure 8:
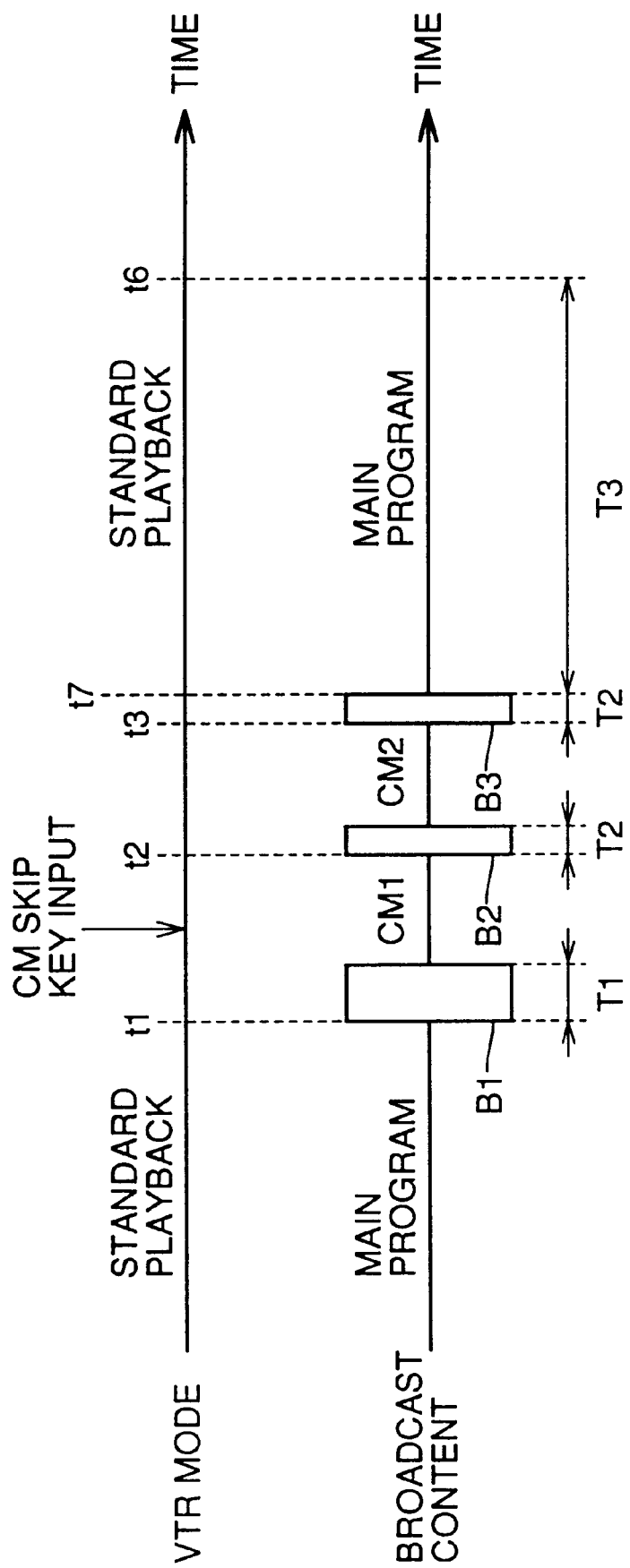

In the above description, the predetermined time T3 is set to be longer than the time between black frames as shown in FIG. 8.

Figure 9:
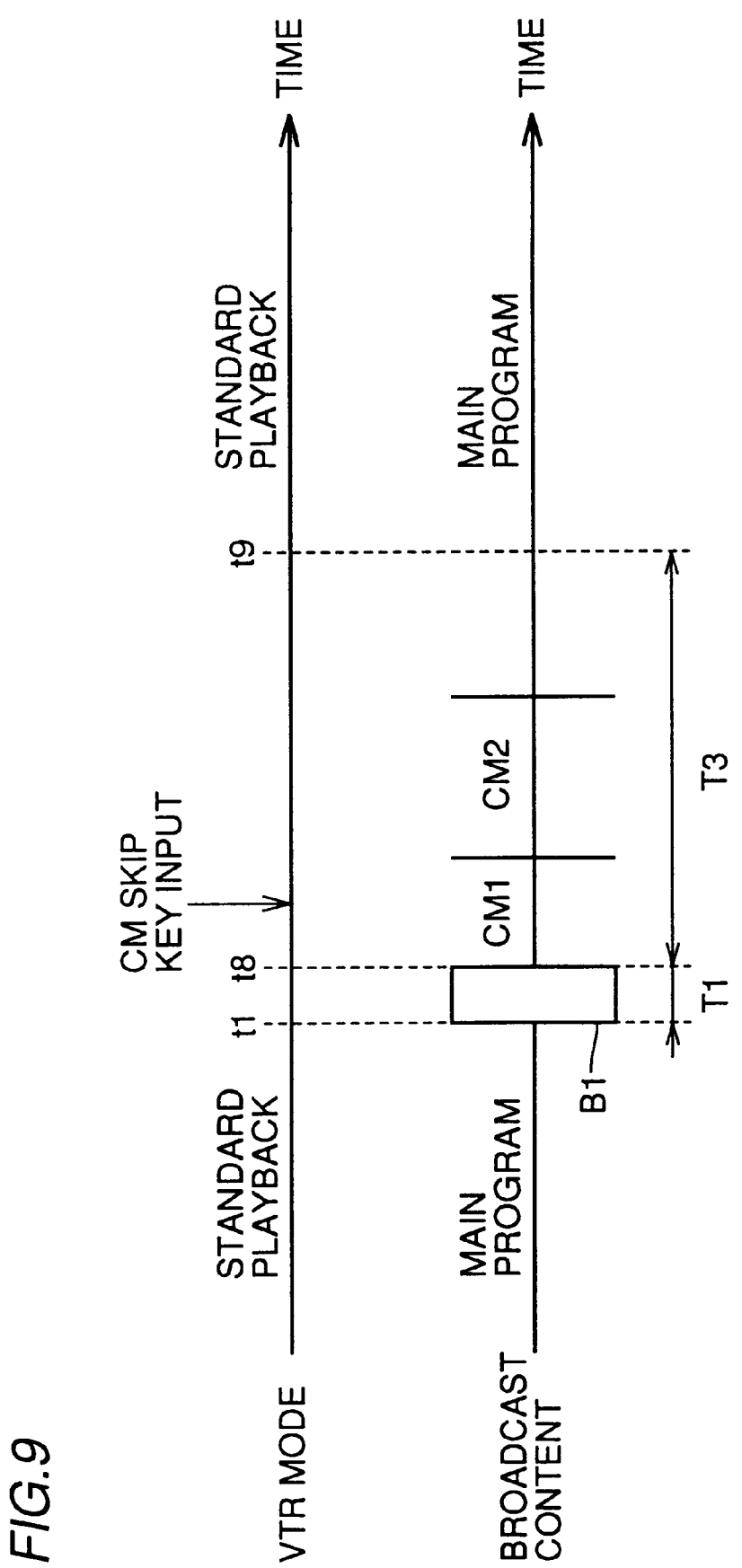

Next, referring to FIG. 9, an operation when there are commercials CM1 and CM2 between main programs and there is only a black frame B1 having the time width T1 between the main program and commercial CM1 will be described.

In this case, the VCR is switched to the cue mode in step S3, a black frame having the time width of T1 or longer is searched in step S4 and a black frame having the time width of T2 or longer is searched in step S5. However, such black frames are not detected.

In step S7, it is determined at time t9 that the predetermined time period T3 has passed. In step S8, it is determined that a black frame having the time width of T2 or longer has not yet been detected.

In that case, after time T3, standard playback mode is resumed in step S12.

As described above, according to the recording and playback apparatus in accordance with the first embodiment, when a commercial starts during reproduction of television broadcast, the user can automatically skip a series of commercials by only one operation, and as a result, the user can watch the main program immediately after the end of the series of commercials.

In the recording and playback apparatus in accordance with the first embodiment, in step S9, the operation is changed to review mode. However, instead of this mode, the operation may be changed to rewind mode.

[Second Embodiment]

The recording and playback apparatus in accordance with a second embodiment of the present invention has similar structure as the recording and playback apparatus in accordance with a first embodiment except that the microcomputer 4 further controls a reference value (threshold value) for recognizing presence of a black frame.

In the recording and playback apparatus in accordance with the first embodiment, the threshold value for recognizing the presence of the black frame is fixed to time width T1 or T2.

However, when the threshold value is fixed in this manner, the following problem arises.

More specifically, if the threshold value is too small with respect to the period of a black frame (and mute portion) to be detected and if a short black frame between commercials is detected, the operation, which should be kept in the cue mode, is changed to the standard playback mode. Therefore, the user have to press the commercial skip key 6D again to skip the commercial.

On the contrary, if the threshold value is too long with respect to the period of the black frame (and mute portion) to be detected, even when a black frame between a commercial and a main program is detected, the operation, which should be changed from the cue mode to the standard playback mode, is kept at the cue mode, and standard playback mode is not resumed. Therefore, even after the main program starts, the operation is still in cue mode, so that the user must forcefully cancel the cue mode by pressing, for example, the stop key 6H.

Therefore, in order to avoid such a problem, the recording and playback apparatus in accordance with the present embodiment is adapted such that the threshold value for detecting a black frame can be varied. Further, as it is difficult for the user to determine whether the threshold value is to be made longer or shorter, microcomputer 4 adjusts the threshold value in accordance with the key operated by the user.

For this purpose, a table of black frame threshold values, such as shown in Table 1 below, is stored in advance in ROM 42 included in microcomputer 4, and in RAM 41, table numbers corresponding to each threshold value is stored.

TABLE 1

| Table No. | BF Threshold Value (sp) |
|---|---|
| 00 | 2 × 16.7 (ms) |
| 01 | 4 × 16.7 (ms) |
| 02 | 5 × 16.7 (ms) |
| 03 | 6 × 16.7 (ms) |
| 04 | 7 × 16.7 (ms) |
| 05 | 8 × 16.7 (ms) |
| 06 | 9 × 16.7 (ms) |
| 07 | 10 × 16.7 (ms) |
| 08 | 11 × 16.7 (ms) |
| 09 | 13 × 16.7 (ms) |
| 10 | 15 × 16.7 (ms) |
| 11 | 16 × 16.7 (ms) |
| 12 | 17 × 16.7 (ms) |
| 13 | 18 × 16.7 (ms) |
| 14 | 22 × 16.7 (ms) |
| 15 | 25 × 16.7 (ms) |

Figure 10:
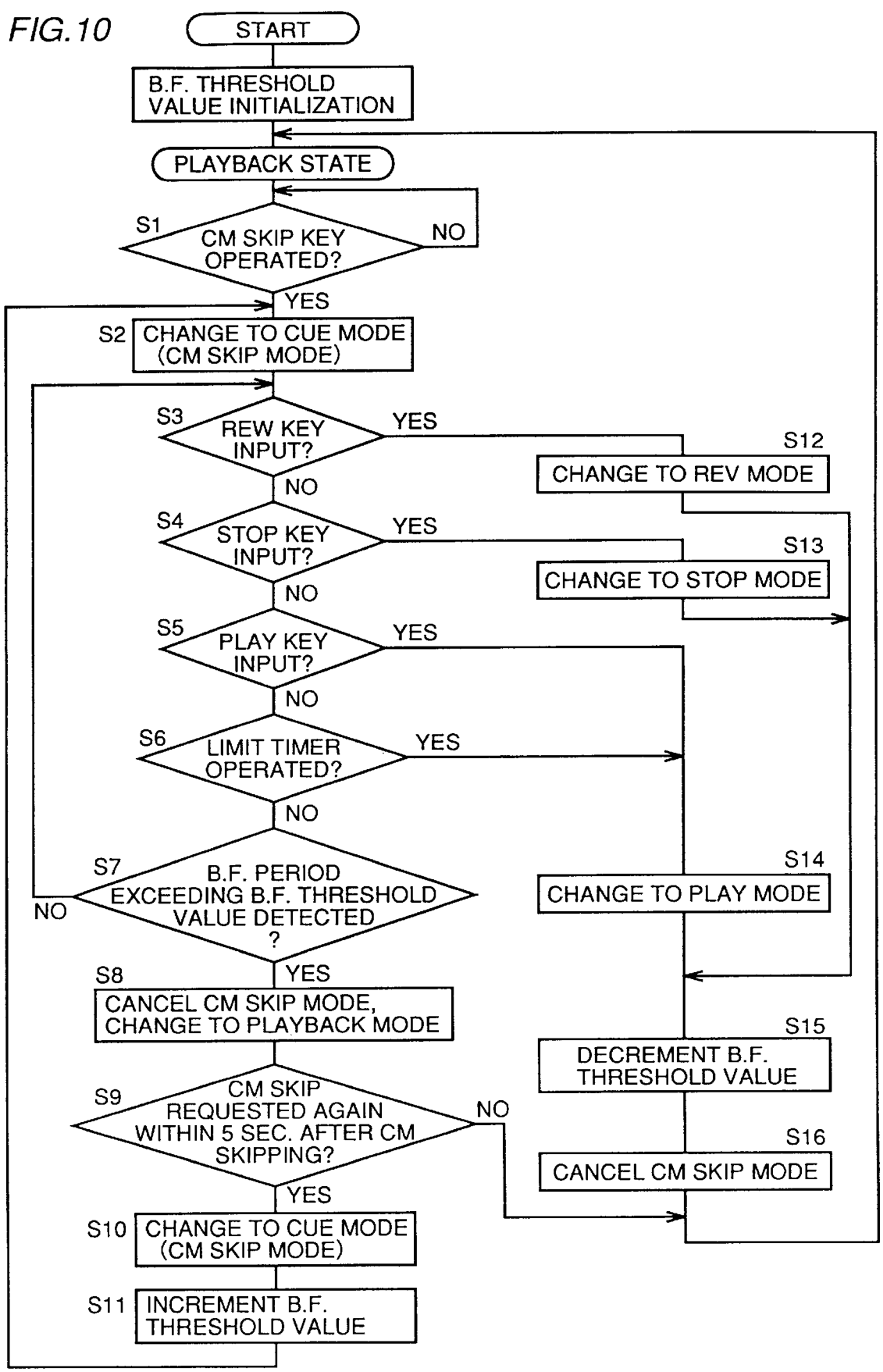
FIG. 10 a flow chart showing the operation of the recording and playback apparatus in accordance with a second embodiment of the present invention.

The operation of the recording and playback apparatus in accordance with the present embodiment will be with reference to FIG. 10.

Firsst, immediately after power on, table number 07 is initially set in RAM 41, and threshold value 10×16.7 (ms) of a black frame read from ROM 42 is stored in RAM 41. Microcomputer 4 controls the VCR based on the threshold value.

Thereafter, when a commercial is encountered during reproduction, in step S1, commercial skip key 6D is pressed by the user. Consequently, in step S2, the VCR is changed to the cue mode (CM skip mode). While the commercial is skipped by cueing, if REW key 6G is pressed by the user in step S3, the operation is switched to review mode in step S12. Meanwhile, if STOP key 6H is pressed in step S4, the operation is switched to STOP mode in step S13. Alternatively, when PLAY key 6E is pressed in step S5, the operation is switched to PLAY mode in step S14. If any of these three keys are pressed, the table number in RAM 41 included in microcomputer 4 is changed to one step smaller value, that is, from 07 to 06 in step S15. Consequently, the threshold value 9×16.7 (ms) of a black frame is read from ROM 42 and stored in RAM 41. Thereafter, microcomputer 4 controls the VCR with the new threshold value.

The threshold value for detecting a black frame is made smaller because this may be the case that the threshold value of a black frame set in advance was too large and detection of a long black frame between a commercial and a main program failed.

After the threshold value is made smaller in step S15, cue mode (CM skip mode) is canceled in step S16.

Further, in microcomputer 4, there is included a limit timer (not shown) which operates when a linear time counter counts ten minutes after last detection of a black frame and a mute portion. If limit timer operates in step S6, the operation is changed to the PLAY mode in step S14, and threshold value of the black frame stored in RAM 41 is made one step smaller in step S15.

Figure 5:
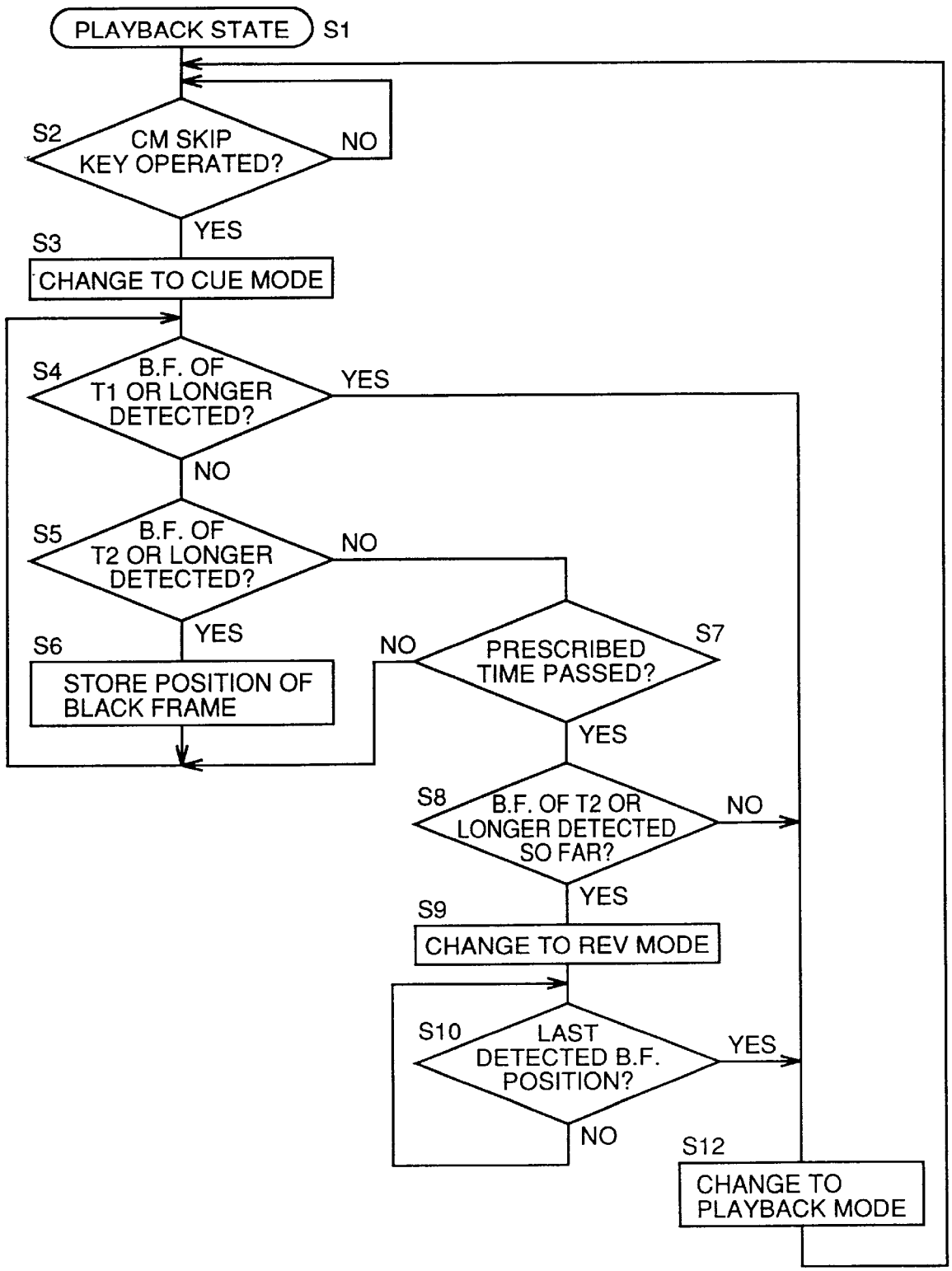
FIG. 5 is a flow chart showing the operation of the recording and playback apparatus shown in FIG. 1.

Further, step S6 corresponds to step S7 of FIG. 5 in the recording and playback apparatus in accordance with the first embodiment.

Meanwhile, if there is not any key input from step S3 to step S5, the limit timer does not operate in step S6 and a black frame is detected in step S7, then cue mode (CM skip mode) is canceled and the operation is returned to playback mode in step S8. Here, if the user presses commercial skip key 6D within five seconds in step S9, the operation is again changed to the cue mode (CM skip mode) in step S10, and the table No. of the threshold value of a black frame stored in RAM 41 is incremented by one in step S11. The threshold value corresponding to the incremented table No. is read from ROM 42 and a new threshold value is set in RAM 41.

The threshold value of the black frame is incremented because this may be the case that the preset threshold value of the black frame was too small so that before a black frame and a mute portion having a long time width existing between the commercial and a main program are detected, a black frame and a mute portion having shorter time width between commercials were detected in step S8 and the operation was switched undesirably to the standard playback mode.

More specific example will be described with reference to FIG. 11.

Figure 11:
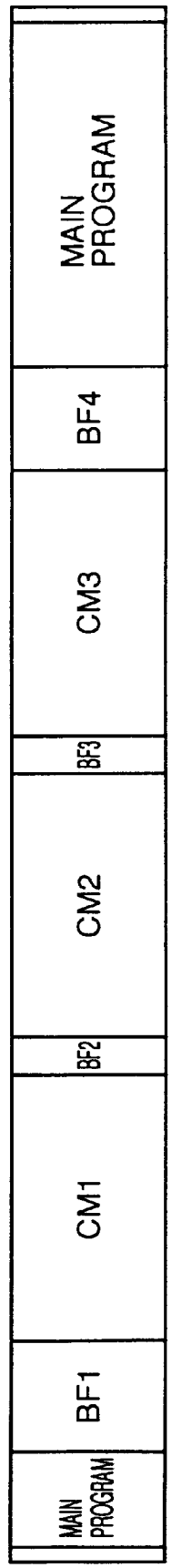
FIG. 11 is an illustration showing the operation of the recording and playback apparatus in accordance with the second embodiment of the present invention.

FIG. 11 shows state of recording on a videotape, on which television broadcast is recorded. In the figure, "program" denotes the main program, and "CM1", "CM2", and "CM3" denote commercial portions.

In the following description, the time widths of black frames and specific values of threshold values of black frames are assumed to be the values in standard play.

More specifically, "BF1" represents a black frame between the main program and CM1, of which period is 350 ms. "BF2" is a black frame between CM1 and CM2, of which period is 1000 ms. "BF3" is a black frame between CM2 and CM3, of which period is 150 ms. "BF4" is a black frame between CM3 and the main program, of which period is 600 ms.

Generally, when the user is to skip the commercial during tape reproduction, the user recognizes the start of a CM when CM1 appears on a reproduced image, and the user presses commercial skip key 6D and sets the VCR to cue mode, in order to skip the commercials. At this time, assume that the set threshold value of the black frame is 25 ms. Since this threshold value is smaller than the time width 100 ms of BF2, the operation is switched to the normal playback mode at the start of CM2.

Assume that the threshold value of the black frame is set at 125 ms. In that case, the threshold value is larger than the time width 100 ms of BF2 but it is smaller than the time width 150 ms of BF3. Therefore, the operation is changed to the standard playback mode at the start of CM3. In the cases such as described above, the threshold value of the black frame is made larger, so that subsequent CM skipping operation will be successful.

By contrast, assume that the threshold value of the black frame is set to 250 ms. This is larger than the time widths of BF2 and BF3 but smaller than the time width 600 ms of BF4. Therefore, the operation is correctly changed to the normal playback mode at the start of the main program.

Assume that the threshold value of the black frame is set to 750 ms. The threshold value of the black frame is larger than any of the time widths of BF2, BF3, and BF4. Therefore, the start of the main program cannot be detected, and therefore standard playback mode is started by the operation of a limit timer unless there is a key operation by the user. In such a case, the threshold value of the black frame is made smaller so as to correctly skip the commercials subsequently.

In the first and second embodiments above, a VCR has been described. However, in a video disk apparatus using a random accessible recording medium, for example, it is also possible to adopt a skip mode in which reproduction tape is skipped to the position of last detected black frame, instead of the review mode in step S9 of FIG. 6.

Further, the video image output from the VCR in the cue mode, the review mode or the rewind mode may not be a reproduced image plane or an EE image plane but a mute or a blue back image plane.

In the recording and playback apparatus in accordance with the first and second embodiments, a black frame is detected to cope with the broadcast system in the United States. In order to apply the present invention to the broadcast system in Europe, the invention is adapted to detect a blue frame or a gray frame, instead of the black frame. The black frame, the blue frame, the gray frame and the like are generally referred to as blank frames.

In the recording and playback apparatus in accordance with the first and second embodiments above, a commercial is skipped by detecting presence of a black frame. However, in addition to detection of a video signal, it is possible to detect an audio signal not higher than a prescribed level, as a start point of an event.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording and playback apparatus, comprising:
    recording and playback means for recording television broadcast signals on a recording medium and for reproducing said television broadcast signals recorded on said recording medium;
    event detecting means for detecting an event included in said television broadcast signals reproduced by said recording and playback means from said recording medium;
    an operating means operated by a user; and
    control means, responsive to an instruction signal from said operating means, for controlling said recording and playback means;
    wherein said control means comprises:
        first setting means for setting said recording and playback means to a cue mode after a first operation by said user selecting a commercial skip mode key while said television broadcast signals are being reproduced;
        storing means for storing an event detection signal output from said event detecting means after the first operation by said user;
        comparing means for comparing the event detection signal stored in said storing means with a preset first threshold value;
        second setting means for setting said recording and playback means to a standard playback mode in response to said comparing means determining that said event detection signal exceeds said first threshold value; and
        means for controlling said recording and playback means such that while said recording and playback means is in the cue mode, if said event exceeding said first threshold value is not detected by said event detecting means in a predetermined second period and said event exceeding a second threshold value smaller than said first threshold value is detected, standard playback is started from a position on the recording medium at which said event exceeding said second threshold value was last detected.

2. The recording and playback apparatus according to claim 1, wherein
    said control means further includes a third setting means for setting said recording and playback means to the standard playback mode when the cue mode continues beyond a predetermined first period in said recording and playback means.

3. The recording and playback apparatus according to claim 1, wherein
    said recording and playback means performs review from the position of said last detected said event exceeding said second threshold value.

4. The recording and playback apparatus according to claim 1, wherein
    said recording and playback means performs rewinding from the position of said last detected said event exceeding said second threshold value.

5. The recording and playback apparatus according to claim 1, wherein
    said recording and playback means skips reproduction to the position of said last detected said event exceeding said second threshold value.

6. The recording and playback apparatus according to claim 1, wherein
    said event is a blank frame included in said television broadcast signals.

7. The recording and playback apparatus according to claim 1, wherein
    said event detecting means detects a blank frame exceeding said first threshold value included in said television broadcast signals, and an a signal level lower than a prescribed value.

8. A recording and playback apparatus, comprising:

recording and playback means for recording television broadcast signals on a videotape and for reproducing said television broadcast signals recorded on said videotape;

blank frame detecting means for detecting a blank frame included in said television broadcast signals reproduced from said videotape by said recording and playback means;

a remote controller having a commercial skip key operated by a user; and a microcomputer, responsive to an instruction signal from said remote controller, for controlling said recording and playback means;

wherein said microcomputer comprises:

first setting means for setting said recording and playback means to a cue mode after a first operation by said user selecting a commercial skip mode key while said television broadcast signals are being reproduced;

a memory for storing a blank frame detection signal output from said blank frame detecting means after the first operation by said user;

comparing means for comparing the blank frame detection signal stored in said memory with a predetermined first threshold value;

second setting means for setting said recording and playback means to a standard playback mode in response to said comparing means determining that said blank frame detection signal exceeds said first threshold value; and means for controlling said recording and playback means such that while said recording and playback means is in the cue mode, if said event exceeding said first threshold value is not detected by said event detecting means in a predetermined second period and said event exceeding a second threshold value smaller than said first threshold value is detected, standard playback is started from a position on the recording medium at which said event exceeding said second threshold value was last detected.

9. A recording and playback apparatus, comprising:

recording and playback means for recording television broadcast signals on a recording medium and for reproducing said television broadcast signals recorded on said recording medium;

event detecting means for detecting an event included in said television broadcast signals reproduced by said recording and playback means from said recording medium;

operating means operated by a user; and control means responsive to an instruction signal from said operating means for controlling said recording and playback means;

wherein said control means comprises:

first setting means for setting said recording and playback means to a cue mode after a first operation by said user selecting the commercial skip mode key while said television broadcast signals are being reproduced;

first storing means for storing an event detection signal produced, as output, by said event detecting means after the first operation by said user;

second storing means for storing a plurality of first threshold values;

comparing means for comparing the event detection signal stored in said first storing means with a given value, the given value being one of said first threshold values accessed from said second storing means;

changing means for changing the given value by accessing, as the given value, another one of the first threshold values from the storing means, in response to an operation of the operating means by said user; and second setting means for setting said recording and playback means to a standard playback mode in response to said comparing means determining that said event detection signal exceeds the given value.

10. The recording and playback apparatus according to claim 7, wherein said changing means decreases said first threshold value when said user presses an operation key of said operating means while said recording and playback means is in cue mode, or when said cue mode continues for a prescribed time period.

11. The recording and playback apparatus according to claim 7, wherein said changing means increases said first threshold value when the recording and playback means is set to the cue mode by said user performing said first operation again within a prescribed time period while said recording and playback means is in standard playback mode.

12. A recording and playback apparatus, comprising:

recording and playback means for recording television broadcast signals on a recording medium and for reproducing said television broadcast signals recorded on said recording medium;

event detecting means for detecting an event included in said television broadcast signals reproduced by said recording and playback means from said recording medium;

an operating means operated by a user; and control means, responsive to an instruction signal from said operating means, for controlling said recording and playback means;

wherein said control means comprises:

first setting means for setting said recording and playback means to a cue mode after an operation by said user selecting a commercial skip mode key while said television broadcast signals are being reproduced;

comparing means for comparing a time width of the event detected by said event detecting means after the operation by said user with a predefined time width; and second setting means, responsive to said comparing means, for setting said recording and playback means to a standard playback mode if the event having a time width larger than a predefined time width occurs.

13. The recording and playback apparatus according to claim 8 wherein the second setting means also sets the recording and playback means to the standard playback mode if, over a predefined period of time elapsing from a last occurrence of the event, a next occurrence of the event does not occur throughout the predefined period of time.

\* \* \* \* \*